Patented Sept. 18, 1951

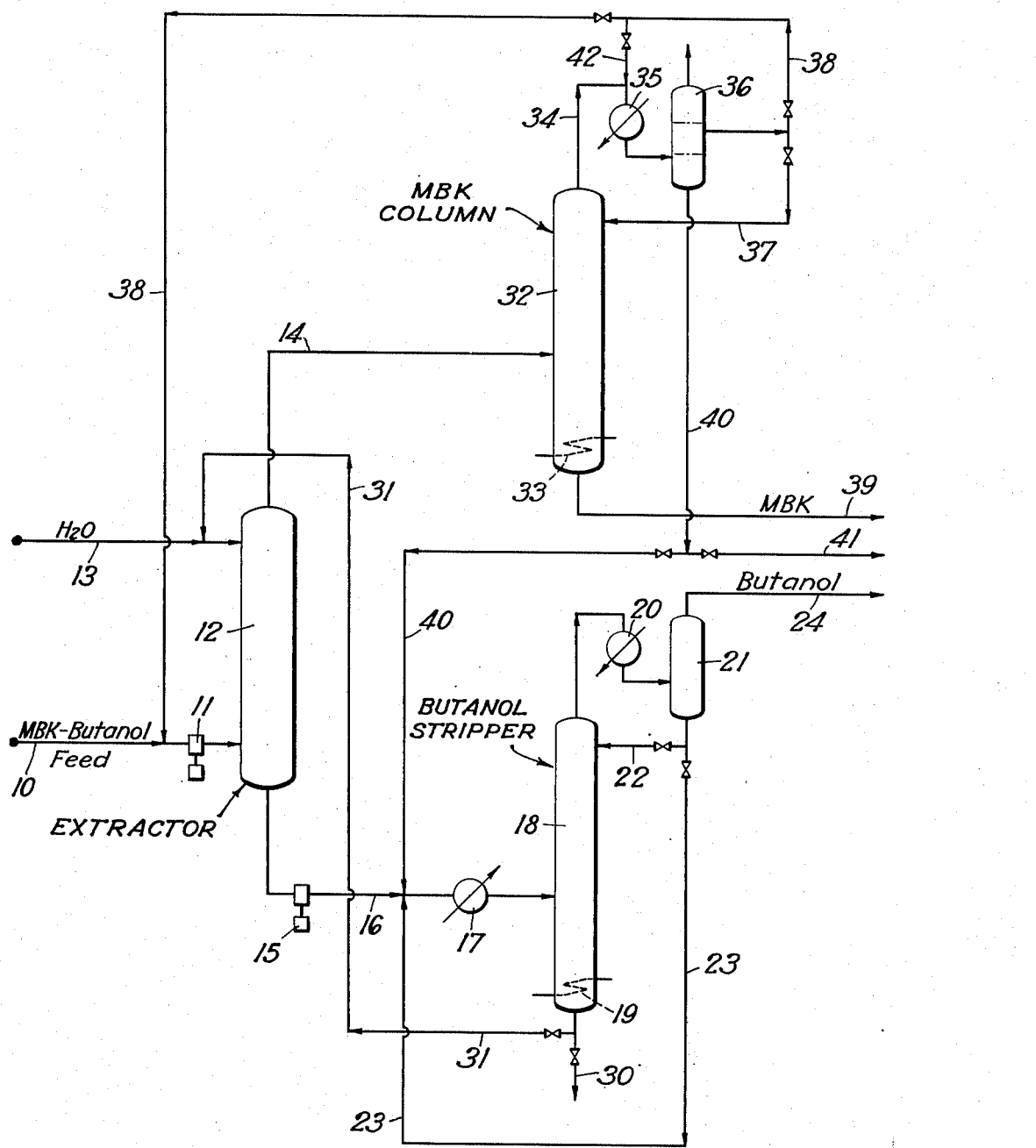

2,568,522

UNITED STATES PATENT OFFICE 2,568,522

SEPARATION OF MIXTURES OF 1-BUTANOL AND METHYL N-BUTYL KETONE

Alfred Steitz, Jr., and David K. Barnes, Tulsa, Okla., assignors to Stanolind Oil and Gas Company, Tulsa, Okla., a corporation of Delaware Application November 27, 1948, Serial No. 62,362

10 Claims. (Cl. 260—593)

This invention relates to the separation and purification of organic oxygenated compounds, and more particularly it pertains to the separation of 1-butanol and methyl n-butyl ketone from mixtures thereof.

The problem of effecting this separation is of substantial commercial importance, owing to the fact that mixtures of 1-butanol and methyl n-butyl ketone are produced by various chemical processes for the production of organic oxygenated compounds. Thus, in the production of organic oxygenated compounds by the hydrogenation of carbon oxides, the reaction of olefins with carbon monoxide and hydrogen, the oxidation of normally liquid hydrocarbons, and the like processes, products of great complexity are mainly obtained which comprise a wide variety of organic oxygenated compounds, such as alcohols, aldehydes, ketones and acids of a broad range of molecular weights. For example, when carbon monoxide is hydrogenated in the presence of an alkali-promoted fluidized finely divided iron catalyst at temperatures of about 600° F. and pressures above about 250 pounds per square inch an aqueous phase and a liquid hydrocarbon phase are produced, both being rich in organic oxygenated compounds. The aqueous phase contains a high proportion of methanol and ethanol and also substantial quantities of other water soluble aliphatic alcohols, including 1-butanol. The aldehydes and/or ketones, including methyl n-butyl ketone, which are present in such aqueous phase have boiling points near the boiling points of the alcohols or form azeotropic mixtures on distillation with the alcohols and the separation of alcohols such as 1-butanol in substantially pure form is made difficult by the complex nature of the mixture in which they are produced. For example, it has been found that 1-butanol which has a boiling point of 117.7° C. cannot be separated by conventional fractional distillation from methyl n-butyl ketone which has a boiling point of 127.2° C. The two compounds form an azeotropic mixture boiling around 116.5° C. and containing approximately 18% by weight of the methyl n-butyl ketone.

It is, therefore, a primary object of our invention to separate methyl n-butyl ketone from 1-butanol. Other objects and advantages of our invention will become apparent from the following description taken with the drawings which form a part thereof.

We have discovered that methyl n-butyl ketone and 1-butanol can be separated substantially completely from a mixture thereof by adding sufficient water to the mixture of 1-butanol and methyl butyl ketone to cause the mixture to separate into an aqueous phase and an organic phase containing 1-butanol and more than 18% methyl butyl ketone. The excess methyl butyl ketone may then be separated by fractionation from the azeotrope of 1-butanol and methyl butyl ketone.

In a simple embodiment of our invention, substantially pure 1-butanol is separated from a mixture of 1-butanol and methyl butyl ketone by extracting a mixture of 1-butanol and methyl butyl ketone with water to produce a butanol-water fraction containing small amounts of methyl butyl ketone and a butanol-MBK fraction in which the MBK comprises more than 18 wt. percent. The enriched butanol-MBK mixture is then fractionally distilled, the MBK-butanol azeotrope being withdrawn overhead and substantially pure MBK being recovered as a bottoms stream. The butanol-water fraction from the extractor is stripped to recover butanol and a water fraction saturated with butanol.

Referring to the drawing, there is a schematic diagram of one embodiment of our invention omitting various heat exchangers, pumps, valves, and other auxiliary equipment for the sake of simplicity. A mixture of 1-butanol and methyl butyl ketone is introduced through line 10 and pump 11 at a low point in extractor 12. Water is introduced through line 13 into the top of the extractor 12 and within the extractor 12 the organic phase flows upwardly countercurrent to the downwardly flowing stream of water. Due to the difference in water solubility between methyl butyl ketone and n-butanol a substantial proportion of the butanol is extracted by the water stream and the depleted butanol stream containing about 15% water and an increased proportion of methyl butyl ketone emerges from the top of the extractor 12 through line 14.

The proportions of the constituents of the charging stock entering extractor 12 via line 10 are unimportant but it is essential that more than 18 weight percent MBK be present in the feed to column 32. Where the ratio of methyl butyl ketone is initially less than the ratio thereof in the binary azeotrope with 1-butanol, the water extraction increases the proportion of methyl butyl ketone withdrawn by line 14. The butanol-methyl butyl ketone azeotrope will be recycled from the fractionation column 32 to the extractor 12 in the form of the binary azeotrope via line 38 until the accumulated quantity of methyl butyl ketone withdrawn from the extractor exceeds the ratio of the 1-butanol binary azeotrope. When this increased proportion is attained, a purified stream of methyl butyl ketone will appear at the bottom of the fractionation column 32 and will be withdrawn via line 39.

The butanol-water stream from the bottom of the extractor 12 consists essentially of 7 wt. per cent butanol and is led by pump 15 through line 16 and heater 17 into an intermediate portion of the stripper column 18 equipped with reboiler 19. Within the stripper 18 the aqueous stream of butanol is readily stripped substantially free from butanol, the latter being taken overhead through condenser 20 into separator 21 from which a portion of the aqueous phase is refluxed through valved line 22 and another portion of this aqueous phase comprising water saturated with butanol is recycled to the stripper 18 via line 23, line 16, and heater 17. The stripped water stream is withdrawn from the bottom of the stripper 18 via valved line 30. A portion may be recycled by line 31 to the extractor 12 by line 13 and another portion may be discarded. The stream entering stripper 18 contains a small proportion of MBK which comes overhead as a ternary azeotrope with 1-butanol and water. Accordingly, the 1-butanol stream withdrawn overhead from the separator 21 via line 24 may contain a small proportion of methyl n-butyl ketone. This residual ketone can be separated by distilling the mixture thereof in the presence of a $C_7$ hydrocarbon as an entrainer. The resulting distillate fraction contains 1-butanol and the entrainer liquid, free from methyl n-butyl ketone, and may subsequently be processed by conventional means to separate a substantially pure 1-butanol fraction.

The enriched butanol-MBK stream recovered by line 14 from the extractor 12 is introduced into an intermediate portion of fractionation column 32 equipped with reboiler 33. In column 32 a ternary azeotrope of methyl butyl ketone, 1-butanol and water and the binary azeotrope of 1-butanol and methyl butyl ketone is removed overhead via line 34, and from the bottom of the fractionation column 32 a stream of substantially pure methyl butyl ketone is removed through line 39.

The overhead streams in line 34 may be recycled via lines 42 and 38 to the extractor 12 or the stream may be cooled in condenser 35 and led into decanter 36 wherein two liquid phases form, an upper organic phase and a lower aqueous phase. The upper phase comprises the binary azeotrope of 1-butanol and methyl n-butyl ketone and a portion may be returned to fractionation column 32 via line 37 as reflux, and another portion may be recycled to extractor 12 via lines 38 and 10 and pump 11. The lower aqueous phase may be supplied via line 40 to the butanol stripper 18, but in some instances where it is not desired to recover the residual organic content, it may be discarded via line 41.

Although we have described our invention with respect to certain specific embodiments thereof, it is to be understood that we do not intend to be limited thereto. Hence, it is contemplated that the apparatus, techniques, and procedures conventionally employed in the chemical and chemical engineering arts may be used in adapting and applying our invention. In general, it may be said that any modifications or equivalents of our invention which would occur to one skilled in the art are to be considered as coming within the scope of our invention.

What we claim is:

1. In a process for separating the components of a mixture of 1-butanol and methyl n-butyl ketone the steps which comprise extracting the mixture with water, recovering from said extracting step a second mixture comprising an increased proportion of methyl n-butyl ketone and a decreased proportion of 1-butanol, the proportion of methyl n-butyl ketone in the second mixture comprising more than the proportion of methyl n-butyl ketone in an azeotrope thereof with 1-butanol, distilling 1-butanol from said second mixture as an azeotrope with methyl n-butyl ketone, and recovering substantially pure methyl n-butyl ketone as a bottoms fraction from said distilling step.

2. In a process for separating the components of an aqueous mixture of 1-butanol and less than 18 wt. per cent methyl n-butyl ketone the steps which comprise extracting the mixture with water to produce a second mixture comprising at least 18 wt. per cent of methyl n-butyl ketone and a decreased proportion of 1-butanol, azeotropically distilling the methyl n-butyl ketone from said enriched second mixture, and recovering substantially pure methyl n-butyl ketone as a bottoms fraction from said distilling step.

3. A process for separating methyl n-butyl ketone from a mixture thereof with 1-butanol which comprises enriching the methyl n-butyl ketone content of said mixture by extracting a portion of said 1-butanol therefrom with liquid water, recovering an enriched mixture of methyl n-butyl ketone in 1-butanol wherein the proportion of methyl n-butyl ketone is greater than 18 wt. per cent, and distilling the binary azeotrope of methyl n-butyl ketone with 1-butanol from said mixture to produce a substantially pure methyl n-butyl ketone.

4. A process for separating methyl n-butyl ketone from a mixture thereof with 1-butanol which comprises extracting therefrom with liquid water a portion of said 1-butanol until the proportion of methyl n-butyl ketone in said mixture is greater than about 18 wt. per cent, and distilling the binary azeotrope of methyl n-butyl ketone with 1-butanol from said enriched mixture to leave a substantially pure methyl n-butyl ketone fraction.

5. The process for separating methyl n-butyl ketone from a mixture thereof with 1-butanol which comprises countercurrently extracting said mixture with liquid water, withdrawing from said extracting step an enriched fraction comprising substantially all of said methyl n-butyl ketone as a second mixture of methyl n-butyl ketone and the binary azeotrope of said methyl n-butyl ketone with 1-butanol, and fractionally distilling the binary azeotrope from the said last mixture.

6. In a process for separating methyl n-butyl ketone from a mixture with 1-butanol, the steps which comprise countercurrently contacting such mixture with liquid water, recovering from said contacting step a second mixture comprising 1-butanol and more than 18 wt. per cent methyl n-butyl ketone, distilling the binary azeotrope of methyl n-butyl ketone and 1-butanol from said enriched mixture, recycling said binary azeotrope to said extraction step, and recovering a bottoms fraction of substantially pure methyl n-butyl ketone from said distilling step.

7. In a process for separating the components of a mixture of butanol and methyl n-butyl ketone, the steps which comprise countercurrently contacting said mixture with liquid water, withdrawing a water solution of butanol from said contacting step, withdrawing a mixture comprising butanol and more than 18 wt. per cent methyl n-butyl ketone from said contacting step, stripping the water solution of 1-butanol to recover a substantially pure 1-butanol fraction, a water-plus-butanol fraction and a substantially butanol-free water fraction, recycling said water-plus-butanol to said stripping step, supplying at least a portion of said butanol-free water stream to said extraction step, and distilling the binary azeotrope of methyl n-butyl ketone and butanol from said enriched mixture to produce a bottoms fraction consisting essentially of methyl n-butyl ketone.

8. In a process for separating the components of a mixture of butanol and methyl n-butyl ketone, the steps which comprise countercurrently contacting said mixture with liquid water, withdrawing from said contacting step a water solution of 1-butanol and an enriched mixture comprising 1-butanol and more than 18 wt. per cent methyl n-butyl ketone, stripping the water solution of 1-butanol to recover a 1-butanol fraction, a water fraction saturated with butanol and a substantially pure water fraction, recycling said water saturated with 1-butanol to said stripping operation, supplying at least a portion of said pure water fraction to said extraction step, distilling the binary azeotrope of methyl n-butyl ketone and 1-butanol from said enriched mixture, supplying said binary azeotrope to said extraction step, and recovering a bottoms fraction of substantially pure methyl n-butyl ketone.

9. In a process for separating the components of a mixture of butanol and methyl n-butyl ketone, the steps which comprise countercurrently contacting said mixture with liquid water, withdrawing a water solution of butanol from said contacting step, recovering a mixture comprising butanol and more than 18 wt. per cent methyl n-butyl ketone from said contacting step, stripping the said water solution of butanol to recover a butanol fraction, a water fraction saturated with butanol and a substantially pure water fraction, recycling said butanol-saturated water fraction to said stripping step, using at least a portion of said pure water fraction in said extraction step, distilling the binary azeotrope of methyl n-butyl ketone and butanol from said enriched mixture, supplying said binary azeotrope to said extraction step, and recovering a substantially pure methyl n-butyl ketone fraction as a bottoms in said distilling step.

10. A process for separating methyl n-butyl ketone from a mixture thereof with 1-butanol which comprises subjecting said mixture to extraction with water, recovering from said extraction step a water-immiscible organic raffinate phase of methyl n-butyl ketone and 1-butanol in which the proportion of methyl n-butyl ketone in said raffinate phase is greater than that found in the methyl n-butyl ketone-1-butanol azeotrope boiling at about 116.5° C. at atmospheric pressure, and subjecting said raffinate phase to fractional distillation to recover substantially pure methyl n-butyl ketone as a bottoms fraction.

ALFRED STEITZ, Jr.
DAVID K. BARNES.

REFERENCES CITED

The following references are of record in the file of this patent:

UNITED STATES PATENTS

| Number | Name | Date |
|---|---|---|
| 2,033,684 | Coleman et al. | Mar. 10, 1936 |
| 2,324,255 | Britton et al. | July 13, 1943 |
| 2,381,032 | Bludworth et al. | Aug. 7, 1945 |